United States Patent [19]
Bowell

[11] Patent Number: 5,345,860
[45] Date of Patent: Sep. 13, 1994

[54] BANDED PISTON AND METHOD OF MAKING

[75] Inventor: Richard A. Bowell, Huber Heights, Ohio

[73] Assignee: Tri Dayton, Inc., Troy, Ohio

[21] Appl. No.: 86,054

[22] Filed: Jul. 6, 1993

[51] Int. Cl.$^5$ ............ F16J 9/00; B23P 15/10; F02F 3/00

[52] U.S. Cl. ............ 92/192; 92/240; 92/250; 277/170; 29/888.047

[58] Field of Search ............ 92/192, 240, 250, 249, 92/254; 277/170, 171, 172; 29/888.04, 888.047, 888.049

[56] References Cited

U.S. PATENT DOCUMENTS

| | | | |
|---|---|---|---|
| 1,584,470 | 5/1926 | Quintenz | 277/172 |
| 1,797,781 | 3/1931 | McCaughey | 92/254 |
| 2,176,281 | 10/1939 | Stillwagon | 92/254 |
| 2,216,577 | 10/1940 | Stillwagon | 92/254 |
| 2,779,646 | 1/1957 | Creed | 277/172 |
| 3,072,071 | 1/1963 | Stroud | 92/254 |
| 3,212,411 | 10/1965 | Storms . | |
| 3,237,953 | 3/1966 | Lucas | 277/172 |

FOREIGN PATENT DOCUMENTS

1503463 8/1970 Fed. Rep. of Germany ........ 92/249

Primary Examiner—Edward K. Look
Assistant Examiner—Hoang Nguyen

[57] ABSTRACT

A piston for use in a hydraulic cylinder which is subject to sudden and extremely high shock load pressures and high temperature operating conditions is provided with a plurality of interlocking axially-spaced circumferential grooves. A band of a heat-formable fluoropolymer is snapped over a retaining ring integral with the piston and the piston is then moved axially through a heated hot-forming cylinder, causing the washer to conform to the cylindrical shape of the piston. At least one circumferential has a side wall which is undercut relative to its cylindrical surface to provide a locking angle. A method of washer preheating prior to hot-forming the band results in better flow of the fluoropolymer toward the undercut side wall. The method of preheating also produces a band skirt with a relatively sharply-defined sealing edge.

18 Claims, 1 Drawing Sheet

BANDED PISTON AND METHOD OF MAKING

This invention relates generally to a fluoropolymer banded piston used in a shock absorbing cylinder where extremely high shock load pressures and high operating temperatures subject the band to blow-by, the term commonly ascribed to the condition where fluid pressures tend to expand the band and force it off the piston. In particular, the invention relates to a hot-formed banded piston and to a method of securing a hot-formed band to a piston in a manner which provides increased resistance to such blow-by.

BACKGROUND OF THE INVENTION

The invention over which the disclosed apparatus and method is an improvement is that which is described in U.S. Pat. No. 3,212,411, issued to Robert S. Storms on Oct. 19, 1965. In that patent a disc of polytetrafluoroethylene (PTFE) was hot-formed onto a piston. When so formed, the piston's periphery received a low coefficient of friction outer surface so as to enable its unrestricted reciprocation within a fluid cylinder. With subsequent incremental improvements in the Storms invention, it soon became the standard for shock absorbers and McPherson struts used in automotive suspension systems. Specific ones of those improvements related to the use of V-grooves with lands between adjacent grooves in the piston and the addition of an anchoring groove at the end of the piston from which the PTFE is applied. This anchoring groove enabled use of a relatively flat washer with a central hole or opening, instead of the disc shown in the '411 patent. The hole was cold-expanded and snapped over a retaining ring at the end of the piston. The washer thus became affixed to the piston, enabling the anchoring groove to hold it tightly in place as it was hot-formed toward the opposite end of the piston to take the piston's cylindrical shape and, in effect, become its outer surface. Notwithstanding these improvements, and despite the fact that they are quite adequate when used in conventional automotive shock absorbers, new problems became apparent when many automobile manufacturers began producing front wheel drive vehicles. This led to a more sophisticated shock absorber design generally referred to as a "strut", more commonly called the well-known McPherson strut.

Not only is the suspension system of a front wheel drive vehicle subjected to much more severe shock loading than rear shocks, but of necessity, a front suspension system must enable proper steering of a rapidly bouncing set of wheels. A shock transmitted through a front wheel when hitting a "chuck hole" is considerably more noticeable than one received by a rear wheel, for example. It is obvious the front wheels must maintain contact with the road surface for best and safest steering. Also, the temperatures at which such front wheel drive struts normally operate, especially in hot climates during summer operation, can be quite high. Constant and rapid piston action on a rough road, especially at relatively high temperatures, required consideration. Since hot-forming does not bond the PTFE to the piston outer surface, a severe shock load could cause blow-by, or a "popping" of the band from the piston. Even without much band wear, blow-by can occur if the pressure is excessive. Naturally, once a band is disconnected from the piston, the hydraulic shock absorber or strut is rendered totally useless to perform its intended function.

SUMMARY OF THE INVENTION

A piston for use in a hydraulic cylinder which is subject to sudden and extremely high shock load pressures and high temperature operating conditions is provided with a plurality of axially-spaced circumferential grooves. A band of a heat-formable fluoropolymer such a PTFE is produced on the outer surface of the piston from a relatively thin, flat washer having a central hole. The hole is initially expanded and the washer is snapped over a retaining ring integral with the piston, into a deep anchoring groove. The piston is then moved axially through a heated hot-forming cylinder, causing the washer to conform to the cylindrical shape of the piston. The washer therefore becomes a band which provides the outer low coefficient of friction surface that subsequently contacts the internal bore of the hydraulic cylinder when assembled therein, At least one of the piston grooves has a side wall which is undercut relative to its cylindrical surface to provide a locking angle. This angle physically anchors the band to the piston surface, preventing blow-by caused by sudden high pressure hydraulic fluid and the resultant expansion and forcing of the band from the piston. A method of washer preheating prior to hot-forming the band results in better flow of the fluoropolymer toward the undercut side wall, The method of preheating also results in a band skirt which creates a relatively sharply-defined edge surface of the band as compared to the customary scalloped edge surfaces commonly encountered when preheating is not employed. The preheating further assists in more tightly conforming the band skirt to the piston at that end thereof at which shock load pressures are typically most pronounced, minimizing the potential detrimental effects of such pressures on band expansion from raising of the skirt.

A principal object of the invention is to provide a banded piston for use in a high shock load situation, with the band being produced from a low coefficient of friction material which is readily hot-formable onto the piston, and with the band gripping the piston periphery in a manner so as to physically interlock therewith.

More specifically, it is an object to create undercut interlocking grooves in a piston surface so as to retain the hot-formed band in place once applied to the piston.

Another object is to form each groove with an acute angle side wall opposed by an obtuse angle side wall whereby to cause the material to flow axially from the obtuse wall toward the acute wall into the undercut as it is being hot-formed.

A further object of the invention is to provide a method of hot-forming a fluoropolymeric band onto a piston to improves its flowability during hot-forming.

Another object is to provide a method of banding a piston which provides a band skirt which tightly conforms to the piston and which creates a relatively sharply defined edge surface on the band.

A further object is to provide a two-stage heating process by initially heating the material to be formed to a preheating temperature greater than the temperature at which the band is heated, and thereafter forming the band onto the piston at a normal hot-forming temperature.

Other objects and advantages will become apparent from the following description, in which reference is made to the accompanying drawings.

DESCRIPTION OF THE PREFERRED EMBODIMENT

Figure 1:
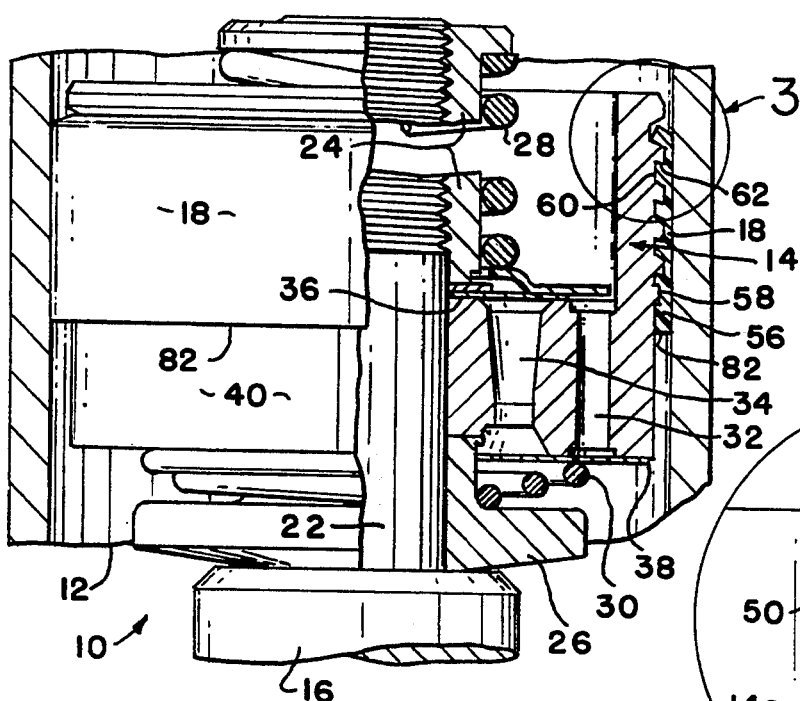
FIG. 1 is a cross-sectional, partly fragmentary view of a conventional strut showing the improved banded piston therein.

A portion of one type of McPherson strut 10 is illustrated in FIG. 1. Its primary components are a cylinder 12 having a smooth internal bore, a piston 14 reciprocable in the bore and a shaft 16 supporting the piston 14. The piston 14 has a low coefficient of friction band 18 surrounding its outer periphery, in much the same general fashion as that shown in the aforementioned Storms U.S. Pat. No. 3,212,411. The primary difference in the present invention compared to that of Storms' teaching (and advancements mentioned above that have been made to the Storms concept) is in the configuration of grooves which allow for a more secure gripping to be achieved between the outer periphery of the piston 14 and the inner surface of the band 18, as will be discussed below. The shaft 16 and cylinder 12 are respectively connected in a conventional manner to load-transmitting and load-receiving members of a vehicle suspension.

The piston 14 is free to slide axially on a cylindrical section of a threaded stud portion 22 of the shaft 16, within limits allowed by a nut 24 and an annulus 26. A pair of springs 28 and 30 which are seated against shoulders on the nut 24 and annulus 26, respectively, bias the piston 14 toward a neutral position, ready to receive a hydraulic shock load from either direction. Annulus 26 is seated against a shoulder where stud portion 22 extends outwardly from the shaft 16. In essence, the piston 14 is free-floating on the stud portion 22 to accommodate severe and sudden shock loading. Conventional sets of orifices 32 and 34 pass axially through a central body portion 40 of the piston 14. Orifice plates 36 and 38 cover the orifices 32 and 34 to assist in metering hydraulic fluid flow to opposite sides of the piston 14. Those persons skilled in the shock absorber and strut art are familiar with the manner in which fluid flows from one side of the piston to the other to prevent shock loads from the cylinder 12 to be transmitted to the shaft 16 and vice versa. Since the banded piston of this invention is usable with any kind of fluid or air shock absorbing system, no further description of the operation of the strut components will be made unless pertinent to a specific action which is required to provide a complete understanding of the invention.

The hot-forming technique described in the Storms '411 patent results in a flat disc being heated and made to conform to the cylindrical shape of the piston exterior. Neither this technique nor subsequent improvements made to the invention of the '411 patent have resulted in a PTFE band which adheres to the piston. The very nature of the PTFE prevents bonding of the band to the piston. Thus, in the '411 patent, in subsequent improvements which are found in the FIG. 2 "Prior Art" device and in the improvements of this invention which are shown in FIG. 3, no actual chemical or other bonding of the inner surface of the band 18 to the piston 14 outer surface is possible. It might be said that hot-forming "irons" the PTFE disc or washer into a sleeve form onto the piston, but this action cannot result in a bonding per se.

Figure 2:
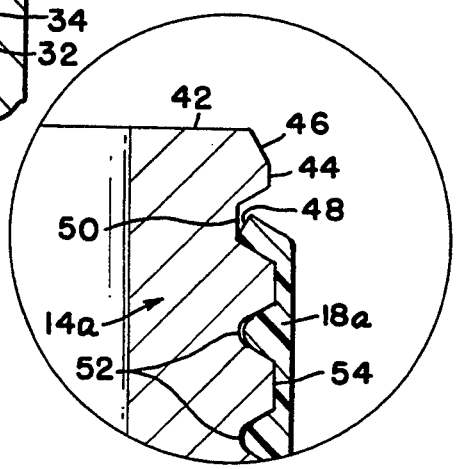
FIG. 2 is an enlarged cross-sectional view of a prior art banded piston which would occupy a circle such as circle 3 of FIG. 1.
Figure 4:
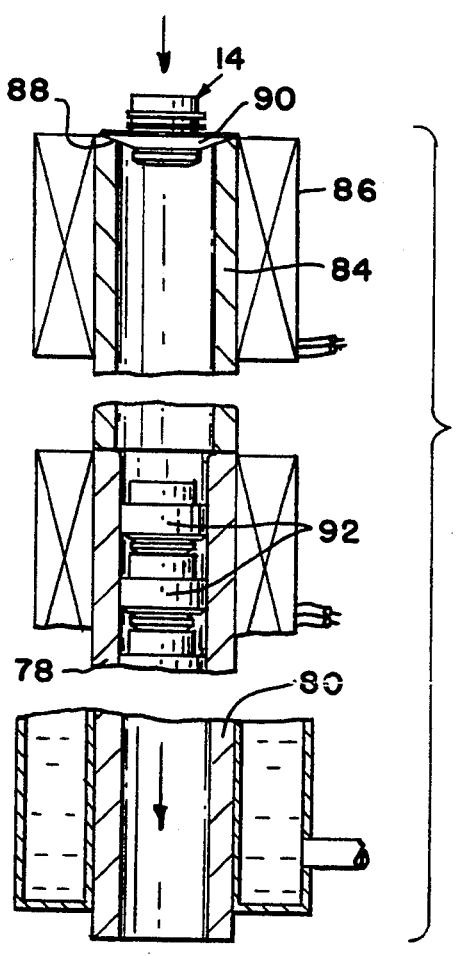
FIG. 4 is a simplified elevational and cross-sectional view of one type of heating and cooling system for practicing the method.
Figure 3:
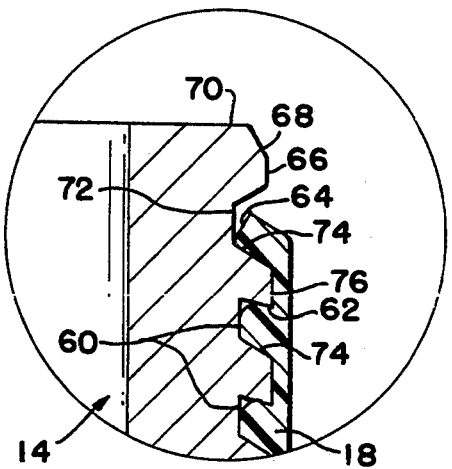
FIG. 3 is an enlarged cross-sectional view of the improved banded piston of my invention, as shown within circle 3 of FIG. 1.

FIG. 2 is an enlargement of the circled portion of FIG. 1. It shows the present "standard" of the industry. The piston 14a has an anchor end 42 having a retaining rim 44. A chamfer 48 at the outer edge of the anchor end 42 enables a flat washer of PTFE to have its centralhole(represented by edge 48) expanded and guided over the rim 44, after which it contracts into an anchoring groove 50. Since this is well understood in the art of hot-forming PTFE bands onto shock absorbing pistons, the washer has not been shown in the flat state. The inner diameter of the central hole is slightly smaller than the diameter of the rim 44, and is essentially comparable to the root diameter of the acnchoring groove 50. The application of the washer to the piston is done by physically rapidly forcing a sintered PTFE washer, while at room temperature, over the rim 44. Securing of the washer into the anchoring groove has been known in the industry for some time. When so secured, the washer takes the shape shown at the top of FIG. 4, being flared away from the anchor end 42 of the piston 14. It can be appreciated that when the washer is flared as shown at the top of FIG. 4, its surface next adjacent the piston 14 is under some compression, while the opposed or outer surface is under tension. Some small evidence of washer wrinkling can be observed when it is in this state. The standard prior art method of hot-forming includes passing the piston and washer assembly through a heating cylinder and a cooling cylinder until it achieves the form shown in FIG. 3.

The piston 14a of FIG. 2 generally has three or four annular grooves 52 with an annular land 54 between adjacent grooves. The cross-sectional view of FIG. 2 shows the lands 54 as appearing to be flat. The grooves 52 may be sixty degrees, or thirty degrees on each side of a perpendicular plane passing through each groove center, with a rounded root diameter. Both sides of the grooves 52 are sloped inwardly toward their roots and urge the PTFE to conform to the shape of the grooves 52. The material never quite flows to the bottom of the grooves 52 during hot-forming, and as is stated in the Storms '411 patent, this provides space for the material to expand radially inwardly during operation of the strut or absorber at high temperatures. The band 18a of FIG. 2 therefore has the washer central hole (corresponding to edge 48) anchored in the anchoring groove 50, and is hot-formed toward the end of the piston 14a opposite from the anchor end 42. As this occurs, the wrinkling inherent at the outset when the washer was first placed over the rim 44 disappears, except at the very end of a skirt portion 56 (FIG. 1) of the band 18a. The band is intended to project beyond a last land 58 and tightly conform to the piston body at that end. Unfortunately, the very end or edges of the conventionally hot-formed washer, the end which constitutes the outer peripheral edge of the washer when in the flat state, becomes somewhat scalloped in the direction around the cylinder. This has been accepted by the industry as normal, even though it has been believed to be the starting point for the phenomenon referred to as blow-by. The presence of the scalloping is also indicative that the band 18a has not had its internal surface placed and maintained in intimitate contact with the piston at the skirt portion 56 of band. As will be discussed later, this does not occur when utilizing my improved method of hot-forming the band. In fact, the new method improves the skirt portion as well as the outer edge of a conventional band such as 18a.

Comparing FIGS. 2 and 3, the improved band 18 is achieved by creating a new type of groove, called herein an interlocking groove 60 because of the undercut side wall 62 which causes the PTFE to physically interlock with the piston 14 after the hot-forming and cooling have been performed. It can be seen from FIGS. 2 and 3 that the introductory part of the operation is the same for both versions. What had been the inner diameter of a washer is now an angled edge 64. It was forced over a retainer rim 66 after being spread over a chamfer 68 at an anchor end 70 of piston 14. It then became anchored in the anchoring groove 72.

The undercut side wall 62 of each of the plurality of interlocking grooves 60 is opposed by a ramp 74, which is so-called because of its function to serve to force material toward the undercut side of the groove 60 during the hot-forming process. As seen in cross-section in FIG. 3, the undercut side wall 62 forms an acute angle with respect to a land 76 with constitutes the outer periphery of the piston 14. Both for purposes of machining the grooves 60 and causing the ramps 74 to force material into the undercut area, an acute angle or locking angle of twelve degrees with respect to a plane perpendicular to the piston axis has been found to be satisfactory. In cross-section, each ramp 74 forms an obtuse angle of one hundred twenty degrees with respect to the adjoining land 76. Stated another way, ramp 74 forms an angle of thirty degrees with respect to a plane perpendicular to the piston axis and which passes through the juncture of ramp 74 and land 76. While these angles are quite suitable, I do not wish to limit myself to any specific angle or angles, since the primary purpose is to find an appropriate angle which will provide the necessary locking and material-ramping function. The tool for forming the interlocking grooves 60 is properly shaped to form all of the interlocking grooves at one time. The tool is directed against the piston at the twelve degree angle described above and forms the profile of the grooves shown in FIG. 3 when reaching the appropriate depth.

While I have stated that the ramps 74 force the flowing PTFE into and against the undercut side walls 62, this did not occur when using the same hot-formingequipment originally used to produce the prior art banded piston of FIG. 2. It became apparent that a new technique had to be developed to provide for greater flowability of the PTFE in order to get the material to flow into the undercut area of the interlocking grooves. This flowability had to be such as to provide the necessary flow while maintaining the integrity of the band material, i.e., to not cause any degradation of the PTFE. Initial prototype attempts were to preheat an assembled washer and piston in an oven at a temperature of 450 degrees F. and immediately thereafter, place it in the conventional hot-forming chamber or cylinder such as the one shown at 78 in FIG. 4. Conventional hot-forming is at a temperature of between 400 and 500 degrees F. for a period of two to two-and-one-half minutes, depending on several factors such as washer thickness, material formulation and the end result desired. The cylinder 78 is of a length which allows assemblies to be placed in the tube seriatim, each added one forcing the previous one along and eventually passing it through a cooling chamber or cylinder 80 usually maintained at a temperature of 78 F. Since the actions of the process taking place within cylinders 78 and 80 are conventional, they will not be described in greater detail.

The results from the initial preheating were found to sufficiently cause the PTFE to flow against the undercut side walls 62 and enable the band 18 to tightly physically grip the piston 14. Somewhat unexpectedly, it was also found that the end or edge surface 82 of the skirt portion 56 of the band 18 tightly conformed to the piston body portion 40 and the last land 58. The edge surface 82 was relatively sharply defined, as compared to the usual scalloped edge surface common when forming the bands in the conventional manner as described solely in connection with cylinders such as 78 and 80 of FIG. 4. It is at this very edge surface 82 where hydraulic fluid can begin to enter beneath and expand the band to cause or enable eventual blow-by. It was also found that the outer corner at the edge surface 82 had a very slight outward flaring which created a lip seal, the desirable tightest part of the band against the cylinder bore. Such a lip seal is present in forming bands conventionally, but due to the scalloping inherent when they are so produced, the lip seal of the standard bands are not as sharply defined as those produced by means of my process.

In order to avoid the necessity of using the low productivity approach of oven-preheating of assemblies, the apparatus of FIG. 4 has been designed and is expected to provide a relatively high production rate. A heatconductive metal preheating chamber or cylinder 84 is provided with an electrical heating jacket 86 to cause the cylinder 84 to achieve a temperature of approximately 800 degrees F. The inside diameter of cylinder 84 is slightly in excess of the diameter of cylinder 78. A beveled edge 88 is provided at the top of the preheating cylinder 84 to serve as the initial or preheating rest area for a washer 90 which has been assembled onto a piston 14. The assembly of the washer onto piston 14 is conventional, the central hole being expanded by a mandrel and the washer stripped from the mandrel and forced over the rim 66 just as the assembly is placed onto the beveled edge 88. The assembly stays in position on beveled edge 88 for approximately six seconds and is then pushed rapidly through the cylinder 84 to the position shown by the assembly 92 in FIG. 4. Thereafter, the assembly progresses in conventional fashion through the hot-forming cylinder 78 and cooling cylinder 80 to complete the process.

Various changes may be made in the construction of the interlocking grooves and the steps of my process without departing from the spirit and scope of the invention. For example, it is believed possible to undercut both side walls of each interlocking groove, even though machining the grooves would then require an additional tool pass, and even though material flowability must be increased to offset the lack of the ramping function. Additionally, under certain circumstances, either or both the preheating temperature and preheating time can be varied to achieve the desired end results.

Having described my invention, I claim:

1. A cylindrical piston having a low coefficient of friction polymeric material band hot-formed onto the surface of the piston from a relatively thin, flat circular washer having a central hole the inner edge of which grips a circumferential anchoring groove in one end of said piston, said band surrounding the outer peripheral surface thereof for absorbing reversible bi-directional shock loads in a bore of a fluid cylinder, said piston having at least one annular groove extending generally radially inwardly of its outer surface, and said material having a first solidified state when operating in a fluid cylinder and a second flowable state during hot-forming of the band onto a piston at temperatures considerably above temperatures at which said piston normally functions when in said solidified state, the improvement comprising:

said groove having opposing side walls, at least one of which side walls forms an acute angle with the adjacent portion of said outer peripheral surface of the piston; and said band being produced by the process of initially preheating said washer to a temperature substantially greater than ambient temperature but not exceeding the temperature at which said material reaches its second flowable state, promptly thereafter hot-forming said washer onto said piston at a temperature sufficiently high to achieve said second flowable state while simultaneously pressing said material radially inward to cause the material to enter and essentially fill said groove, and finally cooling said band to a lower temperature at which said material solidifies, whereby it remains interlocked with said acute angle side wall of said groove and maintains said band firmly against expanding radially outward relative to the outer peripheral surface of said piston.

2. The invention according to claim 1 wherein a plurality of axially-spaced same depth acute angle grooves are provided adjacent each other in said piston.

3. The invention according to claim 2 wherein each said groove has an acute angle side wall on the same side as acute angle side walls of other of said grooves, whereby said plurality of grooves jointly resist radial outward expansion of said band in response to shock loads directed axially relative to the piston from an end thereof opposite the angled side walls of said grooves.

4. The invention according to claim 1 wherein the side wall of said groove opposite said acute angle side wall is at an obtuse angle with respect to the adjacent portion of the outer peripheral surface of said piston, said obtuse angle side wall comprising a ramp which, as heated flowable polymeric material enters said groove and travels down said ramp, produces an axial force causing the flowable material to be directed toward and interlock against said acute angle side wall.

5. The invention according to claim 4 wherein a plurality of axially-spaced same depth acute angle grooves are provided adjacent each other in said piston.

6. The invention according to claim 5 wherein a circumferential land is formed between each adjacent pair of said grooves, each land comprising a flat circumferential supporting surface for that portion of the band located radially outwardly beyond said land.

7. The invention according to claim 5 wherein each said groove has an acute angle side wall on the same side as acute angle side walls of said other grooves, whereby said plurality of grooves jointly resist radial outward expansion of said band in response to shock loads directed axially relative to the piston from an end thereof opposite the angled side walls of said grooves, and further wherein an obtuse angle side wall opposes the acute angle side wall in each said groove.

8. The invention according to claim 7 wherein a circumferential land is formed between each pair of adjacent grooves, said land comprising a flat circumferential supporting surface for that portion of the band located radially outwardly beyond said land.

9. The invention according to claim 8 wherein said piston has an axially-extending cylindrical portion of essentially the same diameter as the piston diameter at the depth of said grooves, said piston portion being located at the end of said piston opposite from the acute angle sides of said annular grooves, and an additional circumferential land between said piston portion and the next adjacent groove, and wherein said band extends axially beyond said additional circumferential land in a direction away from said grooves whereby said band material flows radially inward during hot-forming to seat an inner surface of said band onto said axially-extending piston portion.

10. The invention according to claim 9 wherein said portion of said band extending axially beyond said additional land comprises a band skirt having a relatively sharply defined circumferential edge surface lying essentially in a plane perpendicular to the axis of said piston.

11. The invention according to claim 10 wherein said band is hot-formed over and concentrically with said piston from the end thereof opposite the cylindrical portion seating said band skirt, and wherein said circumferential edge surface of said band is created from the outer peripheral edge surface of said circular washer.

12. A heat-formable fluoropolymer band hot-formed from a first solidified state to a second flowable state from a relatively thin, flat circular washer to jacket a cylindrical piston having at least one inwardly-directed annular groove, said washer, after hot-forming, comprising a tubular sleeve having an outer all for engaging a cylindrical bore of a fluid-actuated shock-absorbing device and an inner wall in surface contact with a pair of lands comprisin8 an outer peripheral surface of said piston and said sleeve further including at least one integral inwardly directed rib extending circumferentially of and essentially filling said annular groove between the sides thereof, at least one side of said rib forming an acute angle with the adjacent inner wall of said sleeve so as to form an interlocking connection between said one side and a correspondingly acute-angled side of said groove, whereby axially-directed fluid forces tending to expand said band relative to said piston are resisted, said bend being produced by the process of initially preheating said washer to a temperature substantially greater than ambient temperature but not exceeding the temperature at which said material reaches its second flowable state, promptly thereafter hot-forming said band onto said piston at a temperature sufficiently high to achieve said second state while simultaneously pressing said material radially inward to cause the material to after essentially fill said groove and finally cooling said to a lower temperature at which said material solidifies, whereby it remains interlocked with said acute angle side wall of said groove.

13. In a method of forming a relatively flat circular fluoropolymeric washer with a central circular opening therethrough into a band over a cylindrical multiple-grooved piston so as to provide a relatively friction-free piston adapted to be reciprocable in a cylindrical bore of a fluid cylinder, said central opening being slightly smaller in diameter than said piston diameter but essentially the same diameter as said piston at the bottom of an anchoring groove provided adjacent one end of said piston, comprising the steps of rapidly expanding said washer at its central opening, pressing said expanded washer over the end of said piston and relaxing the washer to enable the central opening to contract and grip said piston in said anchoring groove; drawing said piston and washer into a heated cylindrical chamber essentially of the same diameter asthe bore of said fluid cylinder to hot-form the washer to the cylindrical shape of said piston; maintaining the piston and washer in said heated chamber for a time period and at a flow-inducing temperature sufficient to cause the fluoropolymer to flow into other grooves of said piston and thereafter cooling the band while it is maintained at said diameter to cause the fluoropolymer to set and firmly grip the outer periphery of said piston, the improvement comprising:

initially heating said washer to a preheating temperature substantially greater than ambient temperature, but not exceeding said flow-inducing temperature prior to drawing the piston into said heated chamber, whereby to enhance flowability of the fluoropolymer into said grooves and thereby reduce the elastic memory of said band to return toward its flat washer state.

14. The invention according to claim 13 wherein said initial heating occurs over a time period shorter than the time to which said washer is subjected to said flow-inducing temperature.

15. The invention according to claim 14 wherein said initial heating takes place while the central opening of said washer encompasses said anchoring groove, and wherein there occurs the additional step of partially cylindrically hot-forming the band after the washer has been heated to said preheating temperature, said partial cylindrical hot-forming being to a diameter greater than the diameter said heated cylindrical chamber.

16. The invention according to claim 15 wherein said initial heating and said hot-forming occur in respective sequential steps within an elongated cylindrical chamber having a first section set to produce said preheating temperature and a second section set to produce said flow-inducing temperature.

17. The invention according to claim 16 wherein said chamber first section has an inlet end and said second section has an outlet end, and passage of pistons being banded through said chamber occurs as a result of the step of introducing one piston into said inlet end and, through end-to-end contact of the pistons being banded, physically ejecting a completed banded piston from said outlet end.

18. The invention according to claim 17 wherein said cylindrical chamber includes a cooling section axially aligned with said first and said second sections, wherein the additional step of cooling of bands occurs after said hot-forming, and wherein the step of introducing of said one piston into said inlet end physically ejects a banded and cooled piston from said cooling section.

* * * * *